Feb. 19, 1929.　　　　　F. J. CASEY　　　　　1,702,460
AUTOMOBILE HOIST
Filed May 3, 1927　　　　2 Sheets-Sheet 1
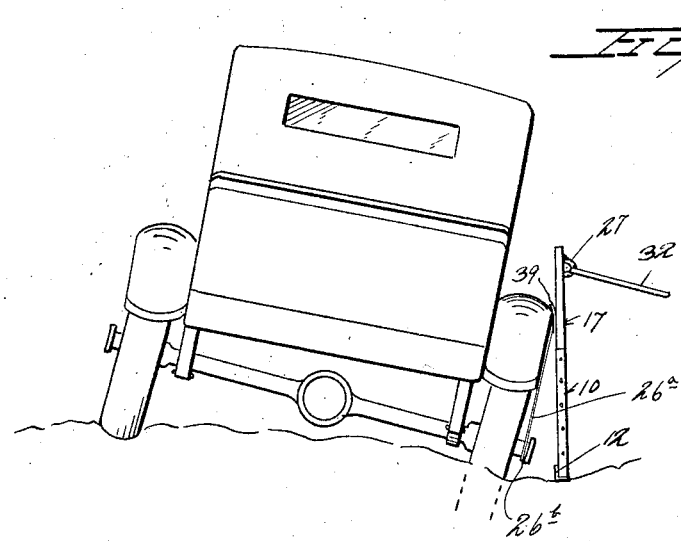
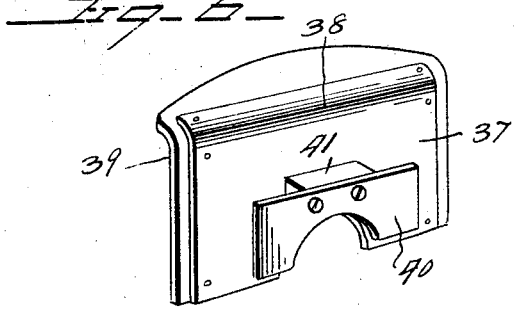
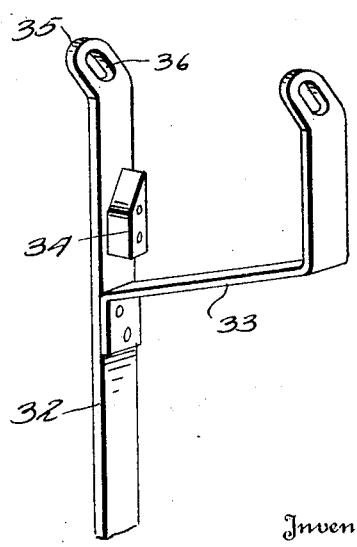
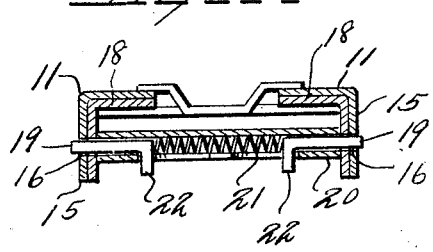
Inventor
F. J. Casey
By Watson E. Coleman
Attorney Feb. 19, 1929.
F. J. CASEY
AUTOMOBILE HOIST
Filed May 3, 1927 — 2 Sheets-Sheet 2
1,702,460
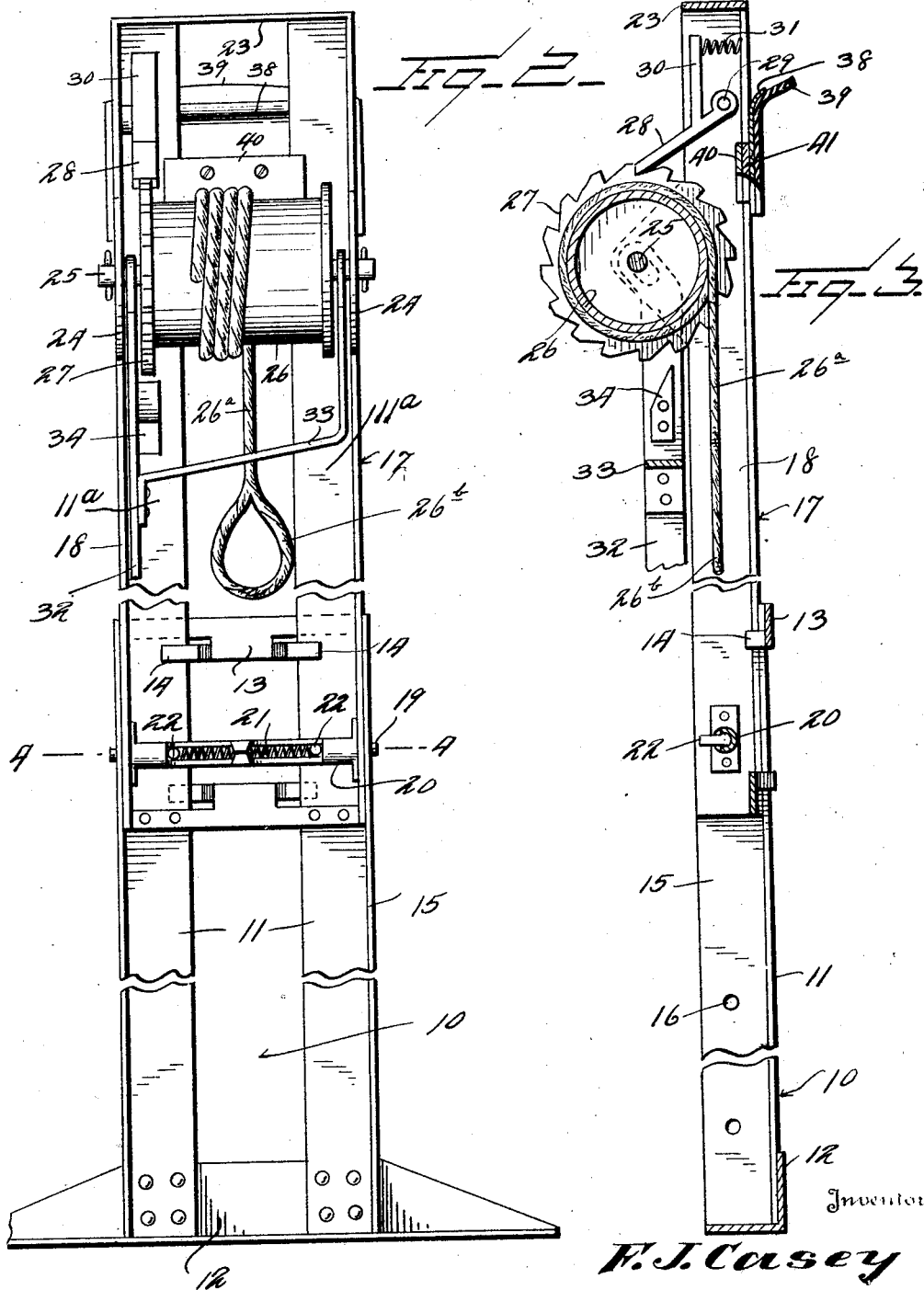
Inventor
F. J. Casey
By Watson E. Coleman
Attorney Patented Feb. 19, 1929.

1,702,460

UNITED STATES PATENT OFFICE.

FRANK J. CASEY, OF ALBION, NEBRASKA.

AUTOMOBILE HOIST.

Application filed May 3, 1927. Serial No. 188,540.

This invention relates to devices in the nature of jacks designed for the purpose of raising automobiles and particularly designed for lifting the wheel of an autotmobile out of a mud hole or off the ground so that chains may be put on, tires may be changed or any other operation performed that requires the wheel to be lifted off the ground. Very often, as illustrated in Figure 1, one wheel of an automobile has sunk so deeply into the mud of a road or into a rut that it is practically impossible or extremely difficult to get a jack in such a position as to lift the wheel upward and it is necessary under these circumstances to lift the depressed side of the automobile by means of planks, levers, billets of wood or anything that can be found for the purpose, until the jack can be inserted.

The general object of this invention is to provide a hoisting device which may be used under any circumstances and without regard as to how far the wheel may have sunken into the road bed and in this connection, I provide a hoist having a cable which extends downward from the upper end of the hoist and engages the hub of the wheel so as to exert a lifting strain thereon, the hoisting device being supported with one end resting on the ground and the upper portion of the hoist supported nearly entirely by leaning against the fender of the automobile, this being raised.

A further object is to provide a device of this character having a cable, as explained, and provided with a drum over which the cable is wound and means for manually operating said drum to lift the automobile or to release the drum to any desired extent to permit the automobile to lower.

A further object is to provide a device of this kind with a vertically extensible standard so as to be adapted for all makes of cars and for all exigencies of service.

Another object is to provide a device of this character which will be relatively light, relatively compact, quick in action, and which is powerful in action.

Other objects will appear in the course of the following description.

My invention is illustrated in the accompanying drawings, wherein:—

Figure 1 is a rear view of an automobile with my jack or lifting device in applied position;

Figure 2 is a rear elevation of the jack or lifting device;

Figure 3 is a vertical section therethrough;

Figure 4 is a section on the line 4—4 of Figure 2;

Figure 5 is a perspective view of the winding drum operating lever;

Figure 6 is a perspective view of the fender guard.

Referring to the drawings 10 designates the lower section of the standard. This section is formed of two angle irons 11 which at their lower ends rest upon an angle iron base 12 or shoe. Attached to and connecting the upper ends of the inner flanges of the angle irons 11 is a cross member 13 having a pair of tongues 14 struck out therefrom and projecting outward from the face of the member 13 and projecting beyond or overlapping the margins of the adjacent flanges of the angle irons. The flanges 15 which extend transversely to the length of the base 12 are formed with a plurality of apertures 16.

Operating within the lower section of the standard is the upper section 17 which is also formed with two angle irons 18 adapted to fit within the flanges 15 and slide up and down therein. This section 17 is held in any desired adjusted position by the oppositely disposed bolts 19 supported in the barrels 20 and adapted to be forced outward by means of the spring 21. The bolts are provided with finger pieces 22 whereby the bolts may be retracted. These bolts 19 project into any desired pair of the apertures 16. The flanges of the angle irons 18 are engaged by the tongues 14 to the lower section and thus the upper section is held in alinement with the lower section and may be raised or lowered thereon to increase or decrease the height of the standard. The upper ends of the angle irons 18 are held from lateral movement by the web 23 or like means. The outwardly projecting flanges of the angle irons adjacent the upper ends are extended outward as at 24 and perforated for the passage of the shaft 25 upon which the drum 26 is mounted. This drum is formed with the ratchet teeth 27 on one flange thereof and wound upon the drum is the cable 26ᵃ which at its lower end is formed with a loop or stirrup 26ᵇ. The shaft 25 is shown as held in place by cotter pins so that the drum and the shaft may be detached when desired. Mounted in place as upon one flange of the section 17 is a pawl 28 which engages the teeth 27 and is forced into engagement therewith by a spring 31 and this pawl when it is lowered prevents any retraction of the drum, but permits the drum to be rotated in a direction to wind upon the cable 26ª. The pawl is pivoted at 29 and formed with a projecting arm 30 extending above the pivot and engaged by the spring 31, this arm when pushed inward causing the pawl to be raised from the teeth 27. Mounted upon the shaft 25 is a lever 32 having a lateral extension 33, this lateral extension on the lever embracing the drum and being oscillatably mounted upon the shaft 25. This lever carries the teeth 34 which is adapted to engage the teeth 27. The end of the lever and of the lateral extension 33 which forms a part thereof is angularly extended as at 35 and provided with slots 36, these slots 36 being disposed at an angle to the length of the lever 32 and the extension 33. The shaft 25 passes through these slots. The slots 36 permit the lever to be shifted inward so that the tooth 34 will be brought into engagement with the teeth 27, or permit the lever to be pulled outward or dropped downward, as shown in Figure 3, thus releasing the engagement between the tooth 34 and the teeth 27. When the lever is shifted inward so as to engage the tooth 34 with the ratchet teeth 27, a pressure of the lever will cause the cable to wind up on the drum. An upward lift applied to the lever causes the inclined face of the lever to engage the teeth 27 which is permitted by the slots 36. By this means a pawl and ratchet action is secured so that a step by step motion can be given to the winding drum or spool. If the lever is pulled out and let go, it will drop to a depending position which releases the drum entirely.

In order to prevent the hoist from scratching the fender of an automobile, I provide a fender guard consisting of a plate 37 of sheet metal about four inches by three in size, the upper margin of this plate being curved as at 38 and line this plate with leather 39. Mounted upon the rear face of the plate is a transversely extending flange 40 spaced from the face of the plate by the block 41, this flange 40 extending on the inside faces of the flanges 11ª while the plate 37, of course, extends over the outside faces of these flanges. Thus this guard has sliding movement upon the upper section of the standard. The guard is so disposed that the upper curved portion thereof hooks over the top of the automobile fender and then as the fender moves upward as the car is raised, the guard also slides upward, preventing scraping of the fender. The use of my hoist will be obvious from what has been stated before and from Figure 1. The two sections of the standard are adjusted to suit the circumstances of the particular case and the foot or base of the standard is disposed against the ground. The spool is released and the loop on the lower end of the cable engaged with the hub of the automobile or with any other portion thereof with which it may be engaged while the upper portion of the standard bears against the fender, the fender being protected by the guard heretofore described. The lever is then operated so as to hoist the automobile step by step until the wheel is out of the mud or raised to the desired height. The pawl 28, of course, prevents any reverse movement of the drum and any lowering of the automobile until desired. The wheel and the adjacent portion of the automobile may be raised up off the ground, to any desired extent so that a jack or perch may be disposed beneath the axle or blocking may be disposed beneath the wheel in order to get out of a mud hole or any other work done. The device is particularly valuable for the reason that balloon tires quite commonly used are so large that when a balloon tire goes flat it lowers the axle of the machine so close to the ground that it is very hard or almost impossible to get a jack so short as to be disposed beneath the axle and still be long enough to raise the wheel sufficiently high to put on a balloon tire. With the automobile hoist which I have devised, it is possible to start with the hub down on the ground as in the case of a broken wheel and yet raise the axle to any desired height. It will be seen that by lifting the pawl from its engagement with the ratchet teeth the end lever may be used to lower the car gently upon the ground or that by pulling out the end lever 32, it will release the engagement of the tooth 34 with the ratchet teeth 27, and that the car may be allowed to drop by releasing the pawl.

Obviously I do not wish to be limited to the details of construction as these may be changed in many ways without departing from the spirit of the invention. Preferably the standard will be made of steel angle irons, each section being about 23 inches long, the standard being about four inches wide. A cable, rope or chain may be wound upon the drum. The winding drum or spool will preferably be a cast iron shell about two and one-half inches in diameter or may have any other desired size. It is to be particularly noted that the standard with this hoist when in use is stabilized laterally by the automobile that is being raised. In other words, the strain placed upon the cable draws the upper end of the standard over against the automobile so that no bracing means has to be used and the standard therefore may be made relatively light and relatively small in cross sectional area.

I claim :—

1. An automobile hoist including a standard adapted to rest upon the ground and be stabilized laterally by leaning against the automobile, means on said standard whereby the automobile may be raised or lowered, said means being swingable laterally outward from the standard and a guard slidingly mounted upon the inner face of the standard and adapted to protect the fender from contact therewith and to raise or lower with the automobile fender.

2. An automobile hoist including a standard adapted to rest upon the ground and to be stabilized by leaning against the automobile, a winding drum mounted upon the standard, a cable carried by the winding drum and having a loop adapted to engage the axle of the automobile, and a guard slidingly mounted upon the standard on the face of the standard opposite the winding drum, the guard having a relatively soft outer face having its upper margin turned outward away from the winding drum, whereby it may be engaged with the fender of the automobile and shift upward upon the standard or downward thereon as the car is raised or lowered by the winding drum.

3. An automobile hoist comprising a standard formed of two spaced angle irons each formed in two sections, the lower sections being joined at their lower ends by a transverse foot projecting beyond the sections to resist lateral tipping, means holding the sections in alinement but permitting them to shift longitudinally on each other, means disposed between the section for locking them in adjusted positions, a winding drum disposed between the outwardly projecting flanges of the angle irons of the upper section and having its axis transverse to the standard, a handle operatively engaged with the drum to cause a rotation thereof, means for locking the drum in any position to which it may be rotated and a cable carried by the drum having a loop at its free end and swingable between the angle irons.

4. An automobile hoist including a standard adapted to rest upon the ground at its lower end, a winding drum on the upper end of the standard, a drive shaft mounted on the standard parallel to the outer face of the standard and supporting said winding drum, the winding drum being disposed outward of the outer face of the standard, a freely hanging flexible connection thereon having a loop adapted to be engaged with a portion of the automobile and having free lateral swinging movement relative to the standard, means for manually rotating the winding drum, means for holding said drum in any desired position, and a fender guard slidably mounted upon the inner face of the standard and adapted to rest against the fender and prevent the fender from being scraped.

In testimony whereof I hereunto affix my signature.

FRANK J. CASEY.